73-656

XR 3,630,592

TX 3 077

United State

[11] 3,630,592

[72] Inventor Dexter P. Cooper, Jr.
Pasadena, Calif.
[21] Appl. No. 23,536
[22] Filed Mar. 30, 1970
[45] Patented Dec. 28, 1971
[73] Assignee Bell & Howell Company
Chicago, Ill.

[54] METHOD AND APPARATUS FOR DETERMINING ENVIRONMENT CONDUCIVE FOR RECORDING INTERFERENCE PATTERNS AND HOLOGRAPHICALLY RECORDING
25 Claims, 9 Drawing Figs.

[52] U.S. Cl. .................................................... 350/3.5,
73/71.3, 250/201
[51] Int. Cl. ....................................................... G02b 27/22
[50] Field of Search ........................................ 73/71.3,
67.5; 350/3.5; 250/201

[56] References Cited
OTHER REFERENCES
Neumann et al., 6 Applied Optics 1097–1104 (6/1967)

*Primary Examiner*—David Schonberg
*Assistant Examiner*—Robert L. Sherman
*Attorney*—Luc P. Benoit ABSTRACT: Methods and apparatus for making a hologram of information on a holographic recording medium provide an object path for an object beam of coherent actinic light leading to the recording medium by way of a representative of the information for a modulation of the object beam by the information, and provide a reference path for a reference beam of coherent actinic light leading to the recording medium for an interference of the modulated object beam with the reference beam and a recording of resulting interference patterns on the recording medium. Beams of coherent inert light are provided and transmitted on the object and reference paths, and a control signal indicating an instant at which conditions in the object and reference paths permit to an establishment and recording of the mentioned interference patterns are provided in response to the transmitted beams of inert light. The requisite object and reference beams are transmitted along the object and reference paths, respectively, in response to the signal indicating the latter instant for an establishment and recording of the interference patterns.

PATENTED DEC 28 1971 3,630,592

INVENTOR.
DEXTER P. COOPER, JR.
BY
ATTORNEY

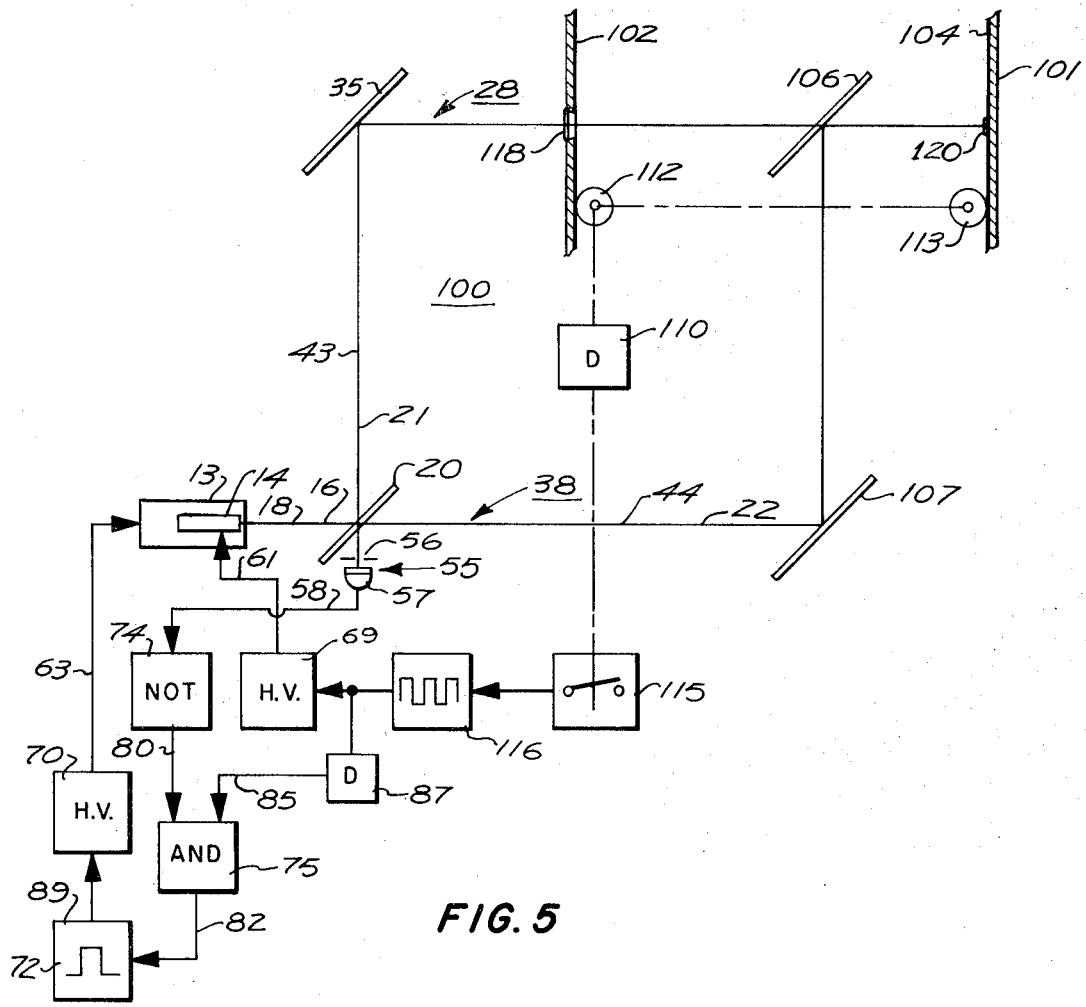
FIG. 5
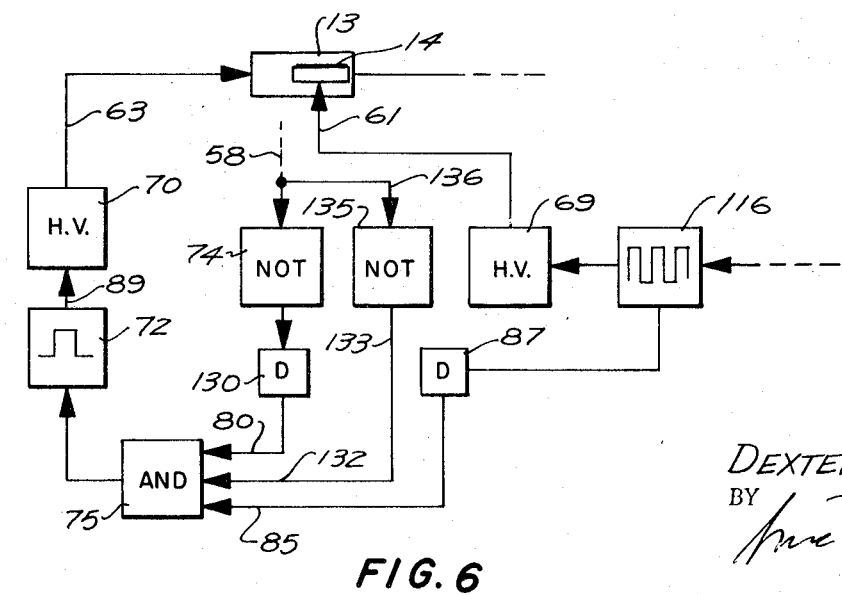
FIG. 6

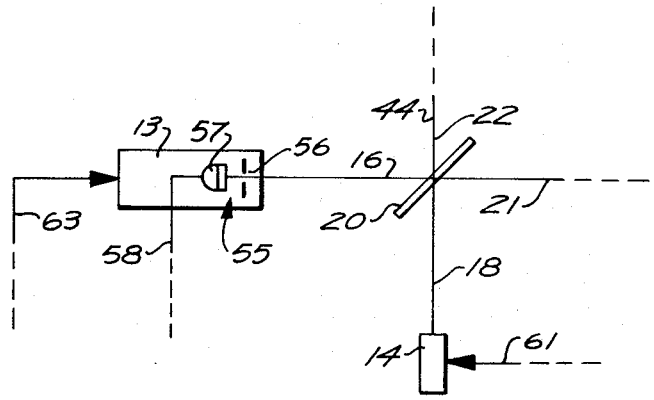
FIG. 7
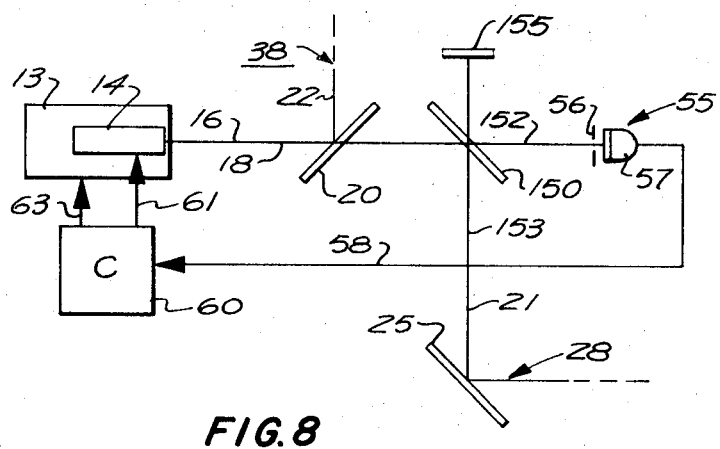
FIG. 8
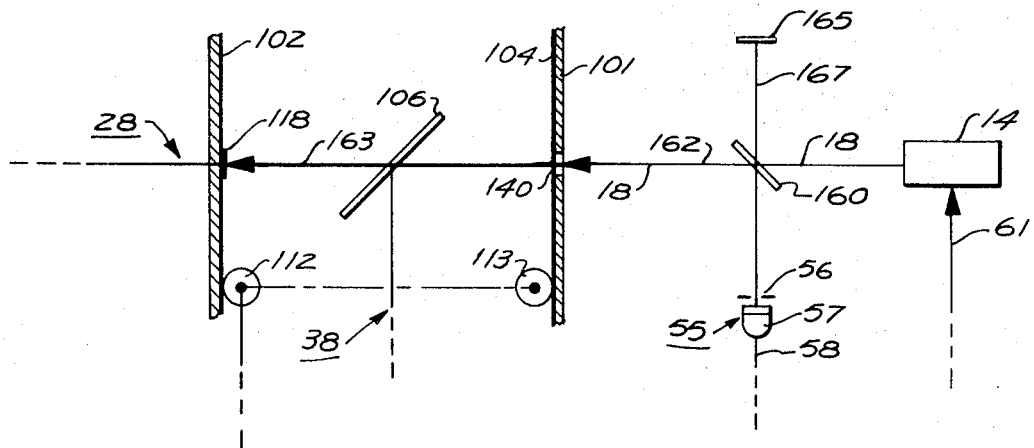
FIG. 9

METHOD AND APPARATUS FOR DETERMINING ENVIRONMENT CONDUCIVE FOR RECORDING INTERFERENCE PATTERNS AND HOLOGRAPHICALLY RECORDING

BACKGROUND OF THE INVENTION

1. Field of the Invention

The subject invention relates to the art of holography and, more particularly, to improved holographic methods and apparatus.

2. Description of the Prior Art

The art of holography has become well known in recent years and typically involves a technique in which a beam of coherent light is split in transit into two beams of which one is modulated by the information to be recorded, while the other serves as a reference beam. Wave fronts of the reference beam are superimposed on wave fronts of the information-modulated beam to provide interference patterns which are recorded in the form of points of varying density. The density of these points is increased where the wave fronts of the two beams arrived in phase and decreased where they arrived out of phase. The information is regenerated by exposing the holographic record to a reference beam which reconstructs the recorded wave fronts.

The present widespread interest in holography is due to a combination of factors which include the high attainable information recording density, a beneficial information redundancy, and the facility of three-dimensional information recording and reproduction.

Since reliance is placed on an exact recording of wave front interference patterns, holographic techniques are extremely sensitive to misalignment and vibration of elements taking part in the recording process. Frequently a single misalignment or vibration destroys an entire information record of affects essential details thereof.

Accordingly, it has been proposed to mount the elements participating in the holographic process on tables weighing hundreds of pounds and being carefully insulated against vibration. It has also been recommended to restrict the preparation of holographic records to early morning hours when traffic or other environmental activity is at a minimum, and to check the stability of the supporting table with a small interferometer consisting of a beam splitter and two first-surface mirrors which are secured to a corner of the table and which direct rays of laser in superimposition on a wall-mounted screen.

Despite these and similar precautions, holographic recording processes continue to be impaired by misalignment or vibration of components.

The problem under consideration is aggravated in holographic motion picture production systems in which film drive and movement introduce continual vibrations, especially if the film advance is of an intermittent type. At best, these problems result in a considerable reduction of the attainable speed of motion picture production, since the film material has to come to rest after each incremental film advancement.

Similar problems are encountered during the recording of data on recording tape or film.

In some applications, the problem under consideration can be alleviated by increasing the laser beam intensity so that a shorter exposure is possible. This simple measure, however, fails to work when factors such as a light or heat sensitivity of the object or environmental conditions place a limit on the intensity of the laser beam, or when the recording medium has a slow sensitivity that requires a prolonged exposure even at high laser light intensities.

SUMMARY OF THE INVENTION

The subject invention overcomes or materially alleviates these disadvantages and, from one aspect thereof, resides in a method for making a hologram of information on a holographic recording medium, comprising in combination the steps of providing a first path for a first beam of coherent actinic light, said first path leading to said recording medium by way of a representation of said information for a modulation of said first beam by said information, providing a second path for a second beam of coherent actinic light, said second path leading to said recording medium for an interference of said modulated first beam with said second beam and a recording of resulting interference patterns on said recording medium, providing and transmitting beams of coherent inert light on said first and second paths, providing in response to said transmitted beams of inert light a control signal indicating an instant at which conditions in said first and second path permit an establishment and recording of said interference patterns, and transmitting in response to said signal said first and second beams of actinic light along said first and second paths, respectively, for an establishment and recording of said interference patterns.

The expression "information" as used herein is intended to be understood in a broad sense, since the subject invention is applicable to such endeavors as the recording of data, the preparation of holograms of objects and images, and the production of holographic motion pictures, to name some representative examples. Accordingly, the expression "representation of information" as used herein may, for instance, refer to an object, to an image, to a master record, or to any other means for modulating a beam of coherent actinic light in the manner required in the preparation of holographic records or images.

"Coherent light" is herein understood to refer to light in which in the absence of modulation all points of the wave fronts have an in-phase relationship of the type present in laser light. To preserve the desired kind of coherence it is generally required that the frequency or wave length of the light be in a very narrow band so that the light is substantially monochromatic, whereby spatial and temporal coherence exist. The most typical modern sources of coherent light are optical masers or lasers, but other types of coherent light sources have been known for years in interferometry. Of course, the expression "coherent light" is not herein intended to exclude methods and systems in which several beams of spatially and temporarily coherent light are provided for the recording of color holograms.

The expression "actinic light" as herein employed refers to light which has the property of bringing about in the holographic recording medium the change requisite for an image formation. For instance, if the recording medium is a photographic chemical emulsion, then the expression "actinic light" refers to light or radiant energy having the property of providing the chemical change in the photographic emulsion which leads to the formation of a latent photographic image. By way of contrast, if the holographic recording medium is magnetic film, such as a premagnetized single-crystal film of manganese-bismuth, on which information is recorded by above-Curie point heating, then "actinic light" refers to light or radiant energy capable of bringing about the requisite thermal effect. While these two examples are given by way of explanation, and not by way of restriction, they are believed to provide an adequate explanation of the meaning of "actinic."

The expression "inert" as herein used is intended to be the opposite of "actinic" and refers generally to the lack of a significant inherent power of information-recording action on the holographic recording medium. It should however be understood that the expression "inert" is not necessarily to be taken in an absolute sense. For instance, if the recording is a premagnetized magnetic layer on which information is recorded by above-Curie point heating of localized portions representative of the information, then the inert light in question may be of such a nature and energy content as to preheat the magnetic layer to a temperature below but in the vicinity of the Curie point, so as to facilitate the information-recording process effected by the actinic light. In short, the expression "inert" does not necessarily refer to the lack of any action on the holographic recording medium, but rather to the lack of an information-recording or actinic exposure action.

The expression "light" as herein employed is not restricted to visible light but is intended to be broad enough to cover infrared and other optical radiations.

From another aspect thereof, the invention resides in a method for making a hologram of information on a holographic recording medium, comprising in combination the steps of providing a first path for a first beam of coherent actinic light, said first path leading to said recording medium by way of a representation of said information for a modulation of said first beam by said information, providing a second path for a second beam of coherent actinic light, said second path leading to said recording medium for an interference of said modulated first beam with said second beam and a recording of resulting interference patterns on said recording medium, providing a beam of coherent inert light, reflecting one part of said beam of coherent inert light at said recording medium, reflecting another part of said beam of coherent inert light at said representation of said information, providing in response to said reflected one and other parts of said beam of inert light a signal indicating a control condition permitting an establishment and recording of said interference patterns, and transmitting in response to said signal said first and second beams of actinic light along said first and second paths, respectively, for an establishment and recording of said interference patterns.

From a further aspect thereof, the invention provides apparatus for making on a holographic recording medium a hologram of information contained in an object, comprising in combination, first means for emitting a pulselike beam of coherent actinic light in response to a control signal, second means operatively associated with said first means for splitting said beam of coherent actinic light into an object beam and a reference beam, and for directing said object beam along an object path leading to said recording medium by way of said object for a modulation of said object beam by said information, and for directing said reference beam along a reference path leading to said recording medium for an interference of said modulated object beam with said reference beam and a recording of resulting interference patterns on said recording medium, third means operatively associated with said second means for providing and transmitting beams of coherent inert light on said object and reference paths, fourth means operatively associated with said second means for receiving said transmitted beams of inert light and for deriving from said received beams of inert light an indication of the instant at which conditions in said object and reference paths permit to an establishment and recording of said interference patterns, and fifth means connected between said first and fourth means for providing said control signal for said first means in response to said indication derived by said fourth means.

From yet another aspect thereof, the subject invention provides apparatus for making on a holographic recording medium a hologram of information contained in an object, comprising in combination, first means for emitting a pulselike beam of coherent actinic light in response to a control signal, second means operatively associated with said first means for splitting said beam of coherent actinic light into an object beam and a reference beam, and for directing said object beam along a first path leading to said recording medium by way of said object for a modulation of said object beam by said information, and for directing said reference beam along a second path leading to said recording medium for an interference of said modulated object beam with said reference beam and a recording of resulting interference patterns on said recording medium, third means operatively associated with said second means for providing a beam of coherent inert light, for reflection of a first part of said beam of coherent inert light at said recording medium, and for reflection of a second part of said beam of coherent inert light at said object, fourth means operatively associated with that second means for receiving said reflected first and second parts of said beam of coherent inert light and for deriving from said received first and second parts an indication of the instant at which conditions in said object and reference paths permit an establishment and recording of said interference patterns, and fifth means connected between said first and fourth means for providing the control signal for said first means in response to said indication derived by said fourth means.

The object referred to in the preceding paragraph may, for instance, be a physical object, or an image, or a master record, or any other means for modulating a beam of coherent actinic light in the manner required in the preparation of holographic records or images.

BRIEF DESCRIPTION OF THE DRAWINGS

The invention will become more readily apparent from the following detailed description of preferred embodiments thereof, illustrated by way of example in the accompanying drawings, in which:

FIG. 5 is a diagrammatic representation of a holographic system in accordance with a third preferred embodiment of the subject invention;

FIG. 6 schematically illustrates a modification of the systems shown in FIGS. 1 through 5;

FIG. 7 diagrammatically illustrates a modification of the systems of FIGS. 1 through 6;

FIG. 8 diagrammatically illustrates a further modification of the system of FIGS. 1 through 6; and FIG. 9 diagrammatically illustrates a modification of the system of FIG. 5, which modification provides a holographic system in accordance with a fourth preferred embodiment of the subject invention.

Like reference numerals in the various figures designate like or functionally equivalent parts.

DESCRIPTION OF PREFERRED EMBODIMENTS

Figure 1:
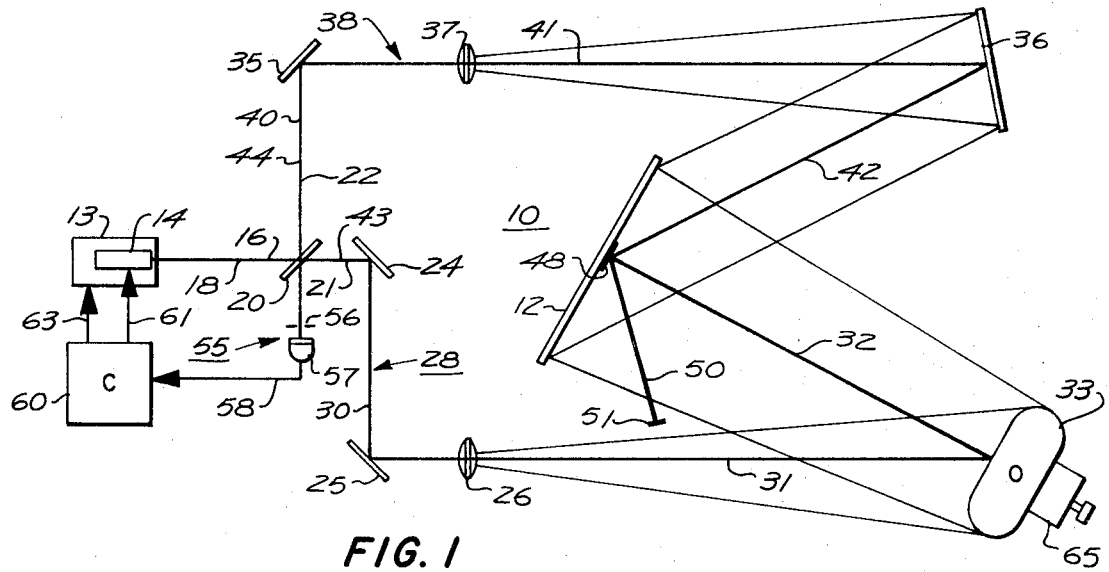
FIG. 1 is a diagrammatic representation of a holographic system in accordance with a first preferred embodiment of the subject invention.

The holographic recording system 10 of FIG. 1 employs a holographic recording medium 12, such as a conventional photographic holography plate, which is photographically sensitive to light emitted by a main laser 13 but not to light emitted by an auxiliary laser 14. By way of example, the main laser 13 may be a conventional argon laser emitting coherent light in the blue spectrum, while the auxiliary laser 14 may be conventional helium-neon laser emitting coherent light in the red spectrum.

In this case the holographic recording medium 12 includes a photographic high-resolution emulsion (if necessary in conjunction with a color filter) which is photochemically sensitive to the blue light of the main laser 12, but insensitive to the red light of the auxiliary laser 14. Under the above definitions, the light emitted by the main laser 13 is coherent actinic light, while the light emitted by the auxiliary laser 14 is coherent inert light.

The main laser 13 is of a conventional pulsed type which emits a pulselike beam 16 of coherent actinic light in response to a control signal. The auxiliary laser 14 is a conventional laser of a pulsed type which emits a pulselike beam 18 of coherent inert light in response to a control signal. A conventional beam splitter 20 splits the actinic light beam 16 into a object beam 21 of coherent actinic light and a reference beam 22 of coherent actinic light.

A pair of first-surface mirrors 24 and 25 cooperate in providing an object path 28 for the beam 21. The object path 28 includes trajectories or branches 30, 31 and 32, and leads to the recording medium 12 by way of an object 33 for a modulation of the object beam 21 by the information to be holographed. The object 33 may be a physical object in which case the information to be holographed may be a representation of surface features of the object 33. Alternatively, the object 33 may be a device for impressing data information on the object beam 21.

A pair of first-surface mirrors 35 and 36 cooperate in providing a reference path 38 for the beam 22. The reference path 38 includes trajectories or branches 40, 41, and 42 and leads to the recording medium 12 for an interference of the object beam 21 as modulated at 33 with the reference beam 22, and for a recording of the resulting interference or wavefront patterns at the recording medium 12.

As is well known in the art of holography, any slight misalignment or vibration during exposure of the recording medium 12, object 33, or elements employed for establishing the paths 28 and 38 has the potential of impairing the establishment of the desired holographic record. It is a main object of the subject invention to overcome or substantially alleviate this detrimental effect.

According to FIG. 1 the beam of inert light 18 is directed onto the beam splitter 20 so as to be split into a first beam 43 of inert light and a second beam 44 of inert light. The first inert beam 43 follows the object path 28, while the second inert beam 44 follows the reference path 38. After having traveled along the object path 28 in a first direction, the first inert beam 43 impinges on the recording medium 12 perpendicularly and is thereupon reflected onto itself so as to travel on the object path 28 in a second direction which runs opposite to the first direction just mentioned. The inert beam 43 thus returns to the beam splitter 20 where it is reflected into a sensing unit 55. In general, the recording medium 12 will be sufficiently reflective for a reflection of the inert beam 43 onto itself. One or more reflective elements 48 may, however, be provided on the recording medium 12 for a reflection of the beams 43 and 44. The reflective element 48 may be provided outside the image area of the recording medium 12. Since a holographic record includes a high amount of information redundancy, it is also possible to provide the reflecting element 48 within the image field of the recording medium 12 without a significant loss of information and resolution. In practice, it is however preferable that the inert beams 43 and 44 do not pass through beam-spreader lenses 26 and 37 provided, respectively, in the object path and the reference path for spreading the actinic object and reference beams. Accordingly, the auxiliary laser 14 preferably is laterally offset from the main laser 13 (see FIG. 2) so that the inert beams 43 and 44 proceed to the side of and past the lenses 26 and 37, respectively.

In this case, the beam splitter 20 and mirrors 24, 25, 35 and 36 are made wide enough to accommodate the inert beams and a reflecting element 48 may be provided on the recording medium 12 to the side of the image recording area. If desired or necessary, a reflecting area or element may then be provided on an extension of, or a mounting structure for the object 33.

After having followed the reference path 38 in a third direction (as distinguished from the first and second directions of travel of the first beam 43) the second beam 44 of inert light impinges on the recording medium 12 or, if used, on the reflecting element 48 at an acute angle to be reflected along a trajectory 50. A small first-surface mirror 51 intercepts the trajectory 50 at right angles for a reflection of the second beam in a fourth direction along the reference path 38 and back to the beam splitter 20. The beam splitter 20 permits the returning inert beam to travel to the sensing unit 55.

It will be appreciated at this juncture that the terms object path and reference path are not necessarily intended to signify narrow trajectories. Quite apart from the fact that elements, such as the lenses 26 and 37, may be provided for a spreading of beams, it may also be preferable to offset the main and auxiliary lasers from each other, so that the actinic and the inert beams travel in different planes one of which intersects the lenses 26 and 37, while the other passes these lenses without intersecting them. In this case, the object path and the reference path are wide enough to accommodate both actinic and inert beams sent along the particular path.

In the preferred embodiment under consideration, the sensing unit 55 is located near the beam splitter 20 for a comparison for the returning beams of inert light. The unit 55 typically includes an aperture or slit member 56 for passing selected parts of the returning inert beams to a photoelectric sensor 57 which provides an electric signal at an output 58. The photoelectric sensor 57 may be of a conventional type used in interferometry work, and may, for instance, include a photocell for receiving both returning inert beams, or may include a separate photocell for each of the returning inert beams.

If the returning inert beams arrive at the sensing unit 55 in interference, a single photocell may for instance be used in the unit 55 to provide a maximum electric signal if the returning inert beams arrive at maximum constructive interference, and to provide a minimum electric signal if the returning inert beams arrive at maximum destructive interference. Variations in the electric signal will then indicate a degree of interference between the two extremes just referred to.

Alternatively, a separate photocell may be employed for each of the returning inert beams and the output signals of these separate photocells may be compared to determine relative phase relationships between the returning inert beams.

If we assume that the system of FIG. 1 is in perfect adjustment if the returning inert beams are out of phase by 180°, then such perfect adjustment is indicated by a zero signal at the sensor output lead 58. An imperfect adjustment due to misalignment or vibration of an element participating in the holographic recording process produces a relative phase shift in the returning inert beams 43 and 44, whereby the output signal at the lead 58 assumes a value different from zero.

It will, therefore, be noted that the desired indication of the instant at which conditions in the object and reference paths 28 and 38 permit an establishment and recording of the holographic reference patterns is provided in response to a comparison by the sensor 55 of the beam 43 of inert light transmitted on the object path 28 with the beam 44 of inert light transmitted on the reference path 38.

A control 60 is constructed to provide a pulse to an input of the auxiliary laser 14 so as to cause the auxiliary laser 14 to emit a pulselike beam 18 of inert light. This beam is split and caused to travel through the system as just described and the returning inert split beams are compared. If these returning beams are not completely out of phase with respect to each other, the sensor 55 provides a signal at the output lead 58. The main laser 13 is not energized as long as this signal is present. However, under the above assumption the signal at 58 disappears as soon as recording conditions in the system 10 become ideal. The control 60 then provides a control signal which causes an energizing pulse to be supplied to an input 63 of the main laser 13. This causes the laser 13 to emit the pulselike beam 16 of coherent actinic light which, as mentioned above, is split among the object and reference paths 28 and 38 to provide at the recording medium 12 a hologram of the object 33 in a conventional manner. The mirror 51 which intercepts the trajectory 50 of the inert beam 44 is made sufficiently small so that it does not significantly interfere with the holographic imaging process during the emission of the actinic laser beam 16. An avoidance of such an interference is further promoted if the reflective surface or element 48 is, in accordance with the above mentioned preferred embodiment, located outside the image recording area of the recording medium 12.

In practice, the system 10 may be subjected to a deliberate brief vibration or a succession of deliberate brief vibrations whereupon the control 60 will automatically pulse the main laser 13 when the requisite spatial interrelationship among the essential elements of the system exists. By way of example, a precision adjustment mechanism 65, which may be of a type used in microtomes, is shown in FIG. 1 for placing the object 33 in such a position that the returning inert beams 43 and 44 cancel themselves out at the sensor 55 when the requisite spatial interrelationship of elements exists.

Figure 2:
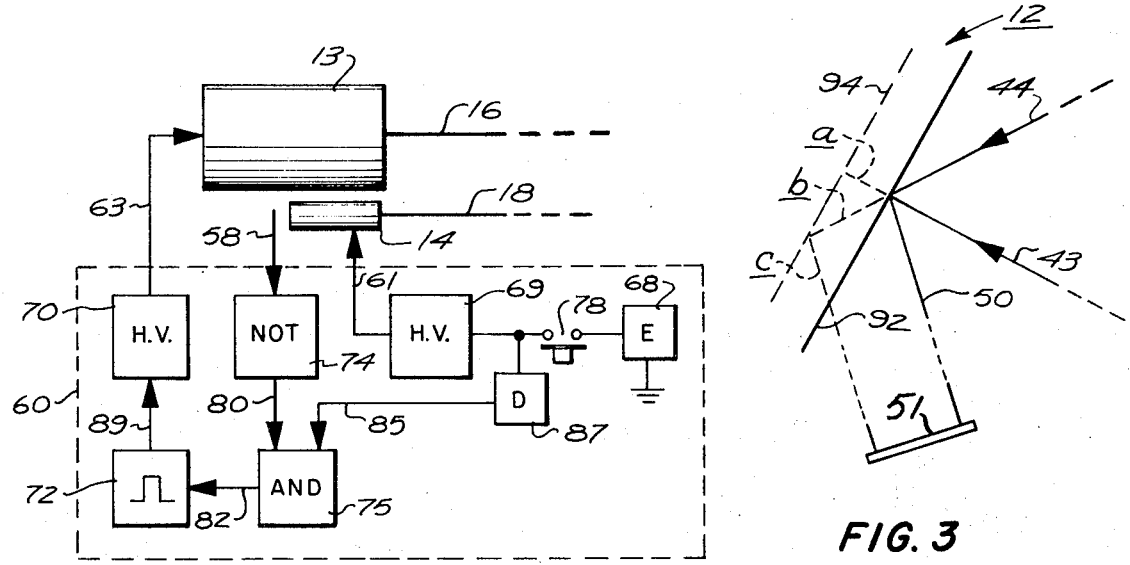
FIG. 2 schematically illustrates a detail of the system of FIG. 1.

The control 60 may include conventional elements as is apparent from FIG. 2.

The control 60 of FIG. 2 includes a source 68 of electric current, a high-voltage energization source 69 for the auxiliary laser 14, a high-voltage energization source 70 for the main laser 13, a control signal source 72 for triggering energization of the main laser 13 by the source 70, a logical NOT element 74 and a logical AND-element 75. As is well known by those skilled in applied Boolean algebra, a NOT element provides an output signal which persists as long as no input signal is applied to the NOT element, and which ceases in response to the application of an input signal to the NOT element. An AND element, on the other hand, only provides an output signal if all of its inputs are energized. In reality, the variation of the output signal of logic elements does not necessarily proceed between a signal and no signal, but rather between a low signal level and a high signal level. Since the latter represent, respectively, a binary zero and a binary one, the practice has, however, taken hold in electronic circuit design circles to talk and think in terms of a zero output signal for the binary zero case.

Operation of the control 60 is initiated by a manual or electronic actuation of a switch 78 which connects the energization source 69 to the source 68. In consequence, the auxiliary laser 14 is caused to emit the beam 18 of inert light. If the returning inert beams 43 and 44 fail to cancel out at the sensor 55, then the NOT-element 74 receives an input signal through the sensor lead 58 so that its output signal at 80 becomes or remains zero. This means that one of the inputs of the AND-element 75 is without input signal so that no output signal can be produced at the output 82 of the AND-element 75. Accordingly, the control signal source 72 is not then caused to provide a control signal, so that no beam is emitted by the main laser 13.

If on the other hand, the returning inert beams 43 and 44 cancel out at the sensor 55, indicating a perfect alignment of the system, then the input signal of the NOT-element 74 goes to zero, whereupon the NOT-element 74 applies an output signal to the input 80 of the AND-element 75. Of course, the AND-element 75 still requires another input signal, namely a signal at its input 85 for the provision of an output signal at 82. The latter second input signal is provided by virtue of the fact that the AND-element input 85 is connected to the switch 78 through a delay element 87 which may be of a conventional type. The delay imposed by the element 87 is such that the system has time to provide or to suspend the provision of an input signal at the AND-element 80 after actuation of the switch 78 before an input signal appears at the AND-input element 85. The AND-element input 85 thus receives a signal whether or not the returning beams 43 and 44 cancel out. However, since the AND-element input 80 does not receive a signal when the returning inert beams fail to cancel out, no energization of the main laser 13 is, as described above, provided in that case, despite the presence of a signal at the AND-element input 85.

On the other hand, both AND-element inputs 80 and 85 are energized when the returning inert beams cancel out, so that the AND-element 75 provides an output signal at 82 which causes the source 72 to provide a control signal at 89 for a triggering of the energization equipment 70 and a consequent emission of the actinic beam 16 by the laser 13.

It will now be recognized that the subject invention provides a system in which the preparation of the hologram takes place at just the right instant.

Figure 3:
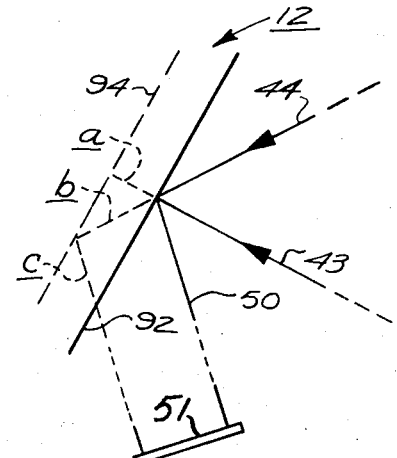
FIG. 3 diagrammatically illustrates a detail of the operation of the system of FIG. 1.

A detail of the operation of the system 10 of FIG. 1 is illustrated in FIG. 3 where a line 92 indicates the desired position of the frontal surface of the recording at acute angles to 92, it follows that $b$, or, if a reflective element 48 is used, of the element 48. If the recording medium surface shifts from the position 92 to a position 94, then the trajectory of the beam 43 of inert light, which is reflected onto itself, is extended by a factor of $2a$. At the same time, the trajectory of the beam 44 of inert light, which is reflected onto itself at 51, is extended by $2(b+c)$. Since the distance $a$ shown in FIG. 3 is perpendicular to 92, while $b$ and $c$ extend at acute angles to 92, it follows that $b$, as well as $c$, is longer than $a$, so that $2(b+c)$ is longer than $2a$. In this manner, a misalignment or vibration of the recording medium 12 lengthens the trajectories of the inert beams 43 and 44 by unequal amounts so that these inert beams are shifted in phase relative to each other, causing an indication of misalignment at the sensor output lead 58.

The inert beams 43 and 44 are, moreover, shifted in phase relative to each other in response to a misalignment or vibration of any of the mirrors 24, 25, 35 and 36, or of the object 33.

Figure 4:
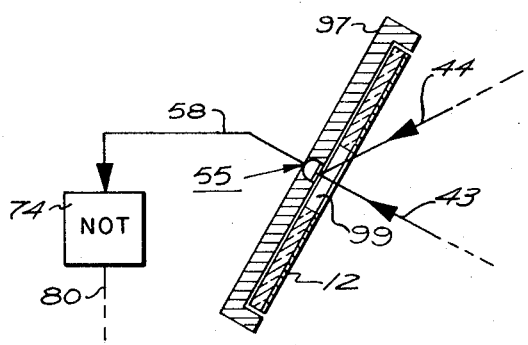
FIG. 4 illustrates a modification of the system of FIG. 1 in accordance with a second preferred embodiment of the subject invention.

According to the modification shown in FIG. 4, the sensor 55 is provided at the recording medium 12 which is held in a rigid support 97. As before, the sensor output lead 58 is connected to the NOT element 74 of the control 60 which provides an input signal for the AND-element input 80 when the inert beams 43 and 44 cancel out at the sensor 55. To permit the beams 43 and 44 to reach the sensor 57, the recording medium 12 has a window 99, preferably outside the image recording area. If desired, the mirror 51 may also be provided in the embodiment of FIG. 4. In that case, a mutual cancellation has to take place among the incoming beam 43, the incoming beam 44 and the portion of the beam 44 which is reflected back to the sensor 55 when the mirror 51 is used in the embodiment of FIG. 4.

The embodiment of FIG. 1 is preferable to the embodiment of FIG. 4 to the extent that a more precise test is possible by the inert beams 43 and 44 if the same, as in the system of FIG. 1, traverse twice the paths 28 and 38, respectively. On the other hand, the embodiment of FIG. 4 is preferable in terms of a simpler and potentially more economical solution.

The system 100 of FIG. 5 serves the holographic recording, on a recording medium 101, of information contained in a transparent master record 102. While not limited in this manner, the system 100 may serve the preparation of holographic nickel masters for the manufacture of holographic motion pictures as, for instance, described in Doyle, Pressing Pictures on Holographic Tape, Electronics (Nov. 10, 1969). Accordingly, the master record 102 may be a film in which color video information is recorded in black-and-white image frames and color coding stripes as described in the Electronics article. The recording medium 101 may then be a plastic tape coated with a layer of photoresist 104, also as described in the Electronics article.

In the system 100 of FIG. 5, the first-surface mirror 35 cooperates with the beam splitter 20 in providing an object path 28 which leads through the transparent master record 102 and through a beam splitter 106 to the recording medium 101. A first-surface mirror 107 and a beam splitter 106 cooperate with the beam splitter 20 to provide a reference path 38 which leads to the recording medium 101. A drive 110 serves to intermittently advance the filmlike master record 102 and the tapelike recording medium 101 as symbolically indicated at 112 and 113, respectively.

The drive 110 also actuates a switch 115 when an image on the film 102 between successive intermittent film advancements has been advanced into the object path 28. The switch 115 actuates a pulse generator 116 which applies a series of pulses to the laser energizing equipment 69 and the delay element 87. When the first pulse is applied to the energizing equipment 69, the auxiliary laser 14 emits a beam 18 of inert coherent light.

As before the inert beam 18 is split into an inert beam 43 which is transmitted on the object path 28, and an inert beam 44 which is transmitted on the reference path 38. The film 102 may have a reflecting element 118 for each frame. The reflecting element 118 intersects the object path 28 so that the inert beam 43 is reflected onto itself at the element 118. The tape 101 may have a reflecting element 120 for each hologram to be recorded. The reflecting element 120 reflects the inert beam 44 onto itself at the element 120.

In this manner, the inert beam 43 is caused to travel in a reverse direction on the object path 28 while the inert beam 44 is caused to travel in a reverse direction on the reference path 38, and the returning inert beams arrive at the sensor 55, pretty much as before.

The relative spatial arrangement of the film 102, tape 104, and other essential components of the system 100 is such that conditions are conductive to a holographic recording process when the interfering returning inert beams 43 and 44 cancel out at the sensor 55. In that case the NOT-element 74 receives no input signal, so that it applies a signal to the AND-element input 80, whereby both inputs 80 and 85 are simultaneously energized when a pulse from generator 116 arrives by way of the delay element 87, as described above in connection with FIG. 2.

In consequence the AND-element 75 applies a signal to the control signal generator 72 and the main laser 13 is caused to emit a pulselike beam 16 of coherent actinic light which is split into an actinic beam 21 that travels along the object path 28 and an actinic beam 22 that travels along the reference path 38. The actinic beam 21 is modulated by the information contained in the particular frame and color coding area of the film 102, and this modulated actinic object beam 21 interferes with the actinic reference beam 22 at the recording medium 101 for the establishment of a holographic interference pattern which is recorded on the photoresist layer 104.

The reflecting element 118 may be omitted or its reflective properties decreased so that a first portion of the inert beam 43 is reflected onto itself at the film 102 and a second portion of the inert beam 43 is reflected onto itself at the reflecting element 120 on the tape 101. In this case both of these reflected first and second portions of the returning inert beam 43 must cancel out with the returning inert beam 44 before a holographic recording process can take place.

If, due to a misalignment in the system, the returning inert beams or beam portions should fail to cancel, then the input signal of the NOT-element 74 will be higher than zero, and the input 80 of the AND-element 75 will not be energized. As indicated above, the main laser 13 will then not be energized. If the particular misalignment is of a permanent nature, inspection of the system and remedial action will be required. No such extensive effort is, of course, required if the misalignment is only due to a temporary vibration in the system.

To test whether a permanent or only a temporary condition exists and to provide for a recording with the least possible delay, the pulse generator 116 emits a series of pulses in short succession, so that the emission of the inert beam 18 and the comparison of the returning inert beams are rapidly repeated and the establishment and recording of a holographic record are initiated as soon as conditions in the system are conducive to this purpose. In the case of temporary vibratory misalignments, the statistical probability of a perfect condition is increased by the fact that the intermittent drive 110 itself imparts vibrations to the system.

After holographic exposure the tape 101 may be treated with an etchant which leaves a holographic relief pattern as described in the above mentioned Electronics article. This relief pattern may then be nickel plated to provide a master die for a mass production of holographic motion picture film by repeated embossment of plastic tapes with the master die, as described in the Electronics article.

If desired, the pulse generator 116 may also be provided between the switch 78 and the components 69 and 87 in the control 60 shown in FIG. 2 so as to provide in the system of FIG. 1 the advantages just outlined with respect to the system of FIG. 5. Also, a vibrator in the nature of the intermittent drive 110 or other conventional vibrating equipment may be provided in the system of FIG. 1 to deliberately vibrate that system for an increase of the statistical probability of perfect component alignment.

In some cases, and particularly if vibration time parameters are comparable to the response time of the control, the systems so far described are not able to handle rapid vibrations in the systems 10 and 100. In these cases the modified control according to FIG. 6 may be employed in the system 10 of FIG. 1 or in the system 100 of FIG. 5.

The output of the NOT-element 74, which again receives its input through the sensor lead 58, is in the control system of FIG. 6 connected to the AND-element input 80 through a delay element 130 which in response to an output signal of the NOT-element 74 applies a signal to the AND-element input 80 after a delay corresponding to the spacing of successive pulses in the pulse series provided by the generator 116. The AND-element 75 is in FIG. 6 modified so as to have three inputs 80, 85, and 132, all of which must be energized before the AND-element 75 applies an output signal to the control signal generator 72. The output 133 of a NOT-element 135 is connected to the AND-element input 132 and the input 136 of the NOT-element 135 is connected to the output lead 58 of the sensor 55. Conventional electronic circuitry may be employed to inhibit an application of signals to the AND-element 75 and to the delay element 130 during intervals between adjacent pulses in the pulse series provided by the generator 116. For instance, a conventional electronic gate (not shown) may be provided between the NOT-element 74 and the delay element 130, and a conventional electronic gate (not shown) may be provided between the NOT-element 135 and the AND-element input 132, and these two gates may be driven or gated by the pulse generator 116, so as to permit a passage of pulses to the delay element 130 and the AND-element input 132, respectively, only during the occurrence of a pulse of the pulse series provided by the generator 116.

With this arrangement the reflected inert beams must cancel out at two successive instants initiated by two successive pulses of the pulse series provided at 116 before the main laser 13 is actuated. No signals will simultaneously appear at the AND-element inputs 80 and 132 if the reflected inert beams cancel out at one instant but not at the next instant. Accordingly, an output signal of the NOT-element 74 in response to a cancelling out of the reflected inert beams only presets the control for a triggering of the main laser 13, while it takes a subsequent output signal of the NOT-element 135 to consummate the triggering of the main laser and emission of the actinic coherent beam 16. In other words, the combination of NOT-elements 74 and 135 and delay element 130 constitutes a counting circuit which only permits triggering of the main laser 13 in response to a count of two successive mutual cancellations of the reflected inert beams. In delicate systems conventional electronic counting circuits may be employed to restrict triggering of the main laser 13 to a count of $n$, where $n$ is any desired integer required in the particular situation.

As shown in FIG. 7, the auxiliary laser 14 may be disposed so that the inert beam 18 arrives at the beam splitter 20 at right angles to the actinic beam 16, and the sensor 55 may be located at the main laser 13 so as to receive reflected returning beams of inert light which leave the beam splitter 20 in parallel to the trajectory of the beam 16. In this case the sensor 55 may be particularly well shielded from the main laser 13.

The principles of FIG. 7 may be incorporated into any of the systems so far discussed.

FIG. 8 illustrates with the aid of a part of the system of FIG. 1 a modification which may be effected in any of the systems so far discussed. According to FIG. 8, the mirror 24 (see FIG. 1) is replaced by a beam splitter 150, oriented as shown in FIG. 8 to permit a provision of the above mentioned object path 28 and to provide for a transmission of the split actinic laser beam 21 from the beam splitter 20 and onto the object path 28.

The above-mentioned beam splitter 20 provides for a splitting of the actinic primary beam 16 and a reflection of the split actinic beam component 22 onto and along the reference path 38 as before. However, the beam splitter 20 is in FIG. 8 narrower than the beam splitter 150 so that the inert beam 18 from the auxiliary laser 14 is not reflected onto the reverence path 38, but laterally passes by the beam splitter 20, to impinge only on the beam splitter 150.

The beam splitter 150 permits a first part 152 of the inert beam 18 to proceed to the sensing unit 55, which may be of the above-mentioned type. A second part 153 of the inert beam 18 is reflected by the beam splitter 150 onto the object path 28.

The inert beam part 153 travels along the object path 28 in practically the same manner as the above-mentioned inert beam 43. Thus, in terms of FIG. 1, the inert beam part 153 travels along the object path 28 via the mirror 25 and the object 33, and preferably past the lens 26, to the reflecting element 48 at the recording medium 12, to be there reflected onto itself and sent back via the object 33 and mirror 25 to the beam splitter 150 and, through that beam splitter, onto a first-surface mirror 155.

The mirror 155 reflects onto itself the sent-back inert object beam just described. In this manner, the sent-back object beam 153 is reflected at the beam splitter 150 into the sensing unit 55.

A short recapitulation of the processes described in the preceding paragraphs may be helpful at this juncture.

Briefly, the inert beam 18 of the auxiliary laser 14 is split into a first inert beam 152, which is directly fed into the sensor unit 55, and into a second inert beam 153 which is transmitted to the recording medium 12 along the object path 28, and which upon reflection at 48 is retransmitted along the object path 28 in a reverse direction, to be directed into the sensor unit 55 by the beam splitter 150 and the mirror 155.

In this manner, the inert beam 152 serves as a reference for the returning inert beam 153, and the sensor unit 55 again provides an electric signal at the lead 58 which indicates the kind and degree of interference between the two inert beams; namely here between the beams 152 and 153.

The remaining operation of the embodiment of FIG. 8 is practically the same as that described above for the system of FIG. 1, in that misalignment or vibration of elements of the object path will prevent operation of the main laser 13 until the instant that practically ideal conditions for the recording of a hologram have come about or been established.

In contrast to the previously described systems, however, the embodiment according to FIG. 1 does not typically respond to misalignments in the reference path. The embodiment of FIG. 8 in the herein described form is, therefore, only recommended for high-quality systems in which misalignments in the reference path are at best negligible.

If that condition is satisfied, the embodiment of FIG. 8 affords a potentially higher accuracy, since the reference inert beam 152 is applied to the sensor unit 55 more directly than the corresponding inert beam 44 in FIG. 1 which is transmitted over the reference path 38.

The embodiment of the subject invention according to FIG. 9 differs from the embodiment illustrated in FIG. 5 in that the auxiliary laser 14 is placed behind the recording tape 101 as shown in FIG. 9. In addition, the reflective element 118 on the film 102 faces in the direction of the tape 101, and the recording tape 101 has a partially transparent or translucent portion 140 for each frame to be holographed on the emulsion 104.

The sensing unit 55 is again connected to one of the controls of FIGS. 5 and 6 by way of the leads 58. The auxiliary laser 14 is caused to emit a beam 18 of coherent inert light as before. According to FIG. 9 the inert beam 18 traverses a beam splitter 160, as well as the partially transparent portion 140 at the recording medium 101 and the beam splitter 106 which unifies the object path 28 and reference path 38. One part 162 of the inert beam 18 is reflected onto itself at the partially transparent portion 140 of the recording medium. Another part 163 of the inert beam 18 is reflected onto itself at the reflective element 118 on the master record 102 which, as before, contains representations of the information to be holographed.

The two reflected parts 162 and 163 of the inert beam are then reflected into the sensing unit 55 for the provision of an electric signal at 58 indicating a condition conducive to the establishment and recording of the desired holographic interference pattern, in response to the degree of interference between the reflected inert beam parts 162 and 163. By way of example, the main laser 13 may be caused to emit the beam 16 of coherent actinic light when the two reflected portions of the inert beam 18 cancel out at the sensing unit 55. For higher accuracy, a first-surface mirror 165 may be provided at a side of the beam splitter 160 opposite the sensing unit 55. The mirror 165 will then receive from the beam splitter 160 a third part 167 of the inert beam 18, and will reflect such third part as a reference beam through the beam splitter 160 into the sensing unit 55. In this manner, three inert beam parts 162, 163 and 167 are available for an accurate timing of the main laser 13 in the above manner.

The embodiment of FIG. 9 is typically a simplified version of the embodiments of FIGS. 5 and 6. The embodiment of FIG. 9 is preferred primarily for reasons of economy if the construction of the system is such that misalignment or objectional vibration of the elements of other than master record 102 and recording medium 101 is unlikely. The embodiments of FIGS. 5 and 6 are preferred if the conditions render a test of all essential optical parts by the inert beam 18 mandatory or desirable.

The systems herein disclosed are also suitable for the holographing of moving objects at a selected phase or selected phases of their movement. For instance, the object 33 of FIG. 1 with the adjustment mechanism 65 may be considered as a movable object that is to be holographed at a propitious moment. The taking of holographic motion pictures of a moving object at selected phases of movement of the object is rendered possible if the recording medium 12 of FIG. 1 is replaced by the recording medium or tape 101 of FIG. 5 which, in the system of FIG. 1, may then be intermittently advanced in the manner shown in FIG. 5.

It will now be recognized that the subject invention substantially facilitates the making of holograms, improves their quality and materially reduces time requirements for their production.

I claim:

1. A method for making a hologram of information on a holographic recording medium, comprising in combination the steps of:

providing a first path for a first beam of coherent actinic light, said first path leading to said recording medium by way of a representation of said information for a modulation of said first beam by said information;

providing a second path for a second beam of coherent actinic light, said second path leading to said recording medium for an interference of said modulated first beam with said second beam and a recording of resulting interference patterns on said recording medium;

providing and transmitting beams of coherent inert light on said first and second paths;

providing in response to said transmitted beams of inert light a control signal indicating an instant at which conditions in said first and second paths permit an establishment and recording of said interference patterns; and transmitting in response to said signal said first and second beams of actinic light along said first and second paths, respectively, for an establishment and recording of said interference patterns.

2. A method as claimed in claim 1, wherein:

said first and said second beams of coherent actinic light are provided by generating and by splitting a beam of coherent actinic light; and said beams of coherent inert light are provided by generating and splitting a beam of coherent inert light.

3. A method as claimed in claim 1, wherein:

said transmission of beams of coherent inert light includes the steps of transmitting a first beam of coherent inert light on said first path, and transmitting a second beam of coherent inert light on said second path; and said signal is provided in response to said first beam of inert light transmitted on said first path, and said second beam of inert light transmitted on said second path.

4. A method as claimed in claim 3, wherein:

said signal is provided in response to a comparison of said first beam of inert light, transmitted on said first path with said second beam of inert light transmitted on said second path.

5. A method as claimed in claim 1, wherein:

said transmission of beams of coherent inert light includes the steps of transmitting a first beam of coherent inert light on said first path in a first direction and subsequently in a second direction opposite said first direction, and transmitting a second beam of coherent inert light on said second path in a third direction and subsequently in a fourth direction opposite said third direction; and said signal is provided in response to said first beam of inert light transmitted in said second direction, and said second beam of inert light transmitted in said fourth direction.

6. A method as claimed in claim 5, wherein:

said signal is provided in response to a comparison of said first beam of inert light transmitted in said second direction and said second beam of inert light transmitted in said fourth direction.

7. A method as claimed in claim 5, wherein:

said first beam of inert light is transmitted in said second direction by a reflection on said recording medium of said first beam of inert light transmitted in said first direction.

8. A method as claimed in claim 5, wherein:

said second beam of inert light is transmitted in said fourth direction by a reflection on said recording medium of said second beam of inert light transmitted in said third direction.

9. A method as claimed in claim 1, wherein:

said transmission of said beam of coherent inert light includes the steps of transmitting a first beam of coherent inert light on said first path, reflecting said first beam of inert light onto itself at said representation of said information, transmitting a second beam of coherent inert light on said second path, and reflecting said second beam of inert light onto itself at said recording medium; and said signal is provided in response to said reflected first and second beams of inert light.

10. A method as claimed in claim 1, wherein:

said transmission of said beam of coherent inert light includes the steps of transmitting a first beam of coherent inert light on said first path, reflecting said first beam of inert light onto itself at said recording medium, transmitting a second beam of coherent inert light on said second path, and reflecting said second beam of inert light onto itself at said recording medium; and said signal is provided in response to said reflected first and second beams of inert light.

11. A method as claimed in claim 1, wherein:

said transmission of said beams of coherent inert light includes the steps of transmitting a first beam of coherent inert light on said first path, reflecting a first part of said first beam of inert light onto itself at said representation of said information, reflecting a second part of said first beam of inert light onto itself at said recording medium, transmitting a second beam of coherent inert light on said second path, and reflecting said second beam of inert light onto itself at said recording medium; and said signal is provided in response to said reflected first and second parts of said first beam of inert light and said reflected second beam of inert light.

12. A method for making a hologram of information on a holographic recording medium, comprising in combination the steps of:

providing a first path for a first beam of coherent actinic light, said first path leading to said recording medium by way of a representation of said information for a modulation of said first beam by said information;

providing a second path for a second beam of coherent actinic light, said second path leading to said recording medium for an interference of said modulated first beam with said second beam and a recording of resulting interference patterns on said recording medium;

providing a beam of coherent inert light;

reflecting a first part of said beam of coherent inert light at said recording medium;

reflecting a second part of said beam of coherent inert light at said representation of said information;

providing in response to said reflected first and second parts of said beam of inert light a control signal indicating a condition permitting an establishment and recording of said interference patterns; and transmitting in response to said signal said first and second beams of actinic light along said first and second paths, respectively, for an establishment and recording of said interference patterns.

13. A method as claimed in claim 12, including the step of:

deriving from said beam of coherent inert light a third part; and employing said third part as a reference relative to said reflected first and second inert beam parts in the provision of said signal indicating a condition permitting an establishment and recording of said interference patterns.

14. A method for making a hologram of information on a holographic recording medium, comprising in combination the steps of:

providing a first path for a first beam of coherent actinic light, said first path leading to said recording medium by way of a representation of said information for modulation of said first beam by said information;

providing a second path for a second beam of coherent actinic light, said second path leading to said recording medium for an interference of said modulated first beam with said second beam and a recording of resulting interference patterns on said recording medium;

providing a beam of coherent inert light;

transmitting a first part of said beam of coherent inert light on said first path;

providing in response to said transmitted first part and in response to a second part of said beam of coherent inert light a control signal indicating an instant at which conditions in said first path permit to an establishment and recording of said interference patterns; and transmitting in response to said signal said first and second beams of actinic light along said first and second paths, respectively, for an establishment and recording of said interference patterns.

15. Apparatus for making on a holographic recording medium a hologram of information contained in an object, comprising in combination:

first means for emitting a pulselike beam of coherent actinic light in response to a control signal;

second means operatively associated with said first means for splitting said beam of coherent actinic light into an object beam and a reference beam, and for directing said object beam along an object path leading to said recording medium by way of said object for a modulation of said object beam by said information, and for directing said reference beam along a reference path leading to said recording medium for an interference of said modulated object beam with said reference beam and a recording of resulting interference patterns on said recording medium;

third means operatively associated with second means for providing and transmitting beams of coherent inert light on said object and reference paths;

fourth means operatively associated with said second means for receiving said transmitted beams of inert light and for deriving from said received beams of inert light an indication of the instant at which conditions in said object and reference paths permit to an establishment and recording of said interference patterns; and fifth means connected between said first and fourth means for providing said control signal for said first means in response to said indication derived by said fourth means.

16. Apparatus as claimed in claim 15, wherein:
said third means include means for providing and transmitting a first beam of coherent inert light on said object path, and providing and transmitting a second beam of coherent inert light on said reference path; and
said fourth means include means for receiving said transmitted first and second beams of inert light and for deriving from said received first and second beams of inert light an indication of said instant.

17. Apparatus as claimed in claim 16, wherein:
said fourth means include means for providing said indication in response to a comparison of said first beam of inert light transmitted on said object path with said second beam of inert light transmitted on said reference path.

18. Apparatus as claimed in claim 15, wherein:
said third means include means for providing and transmitting a first beam of coherent inert light on said object path in a first direction and subsequently in a second direction opposite said first direction, and providing and transmitting a second beam of coherent inert light on said reference path in a third direction and subsequently in a fourth direction opposite said third direction; and
said fourth means include means for receiving said first beam of inert light transmitted in said second direction and said second beam of inert light transmitted in said fourth direction, and for deriving from said received first and second beams of inert light an indication of said instant.

19. Apparatus as claimed in claim 18, wherein:
said fourth means include means for providing said indication in response to a comparison of said received first beam of inert light with said received second beam of inert light.

20. Apparatus as claimed in claim 15, wherein:
said third means include means for providing and transmitting a first beam of coherent inert light on said object path, for reflection of said first beam of inert light onto itself at said object, and for providing and transmitting a second beam of coherent inert light on said reference path, for reflection of said second beam of inert light onto itself at said recording medium; and
said fourth means include means for receiving said reflected first and second beams of inert light and for providing said indication of said instant in response to said received first and second beams of inert light.

21. Apparatus as claimed in claim 15, wherein:
said third means include means for providing and transmitting a first beam of coherent inert light on said object path, for reflection of said first beam of inert light onto itself at said recording medium, and for providing and transmitting a second beam of coherent inert light on said reference path, for reflection of said second beam of inert light onto itself at said recording medium; and
said fourth means include means for receiving said reflected first and second beams of inert light and for providing said indication of said instant in response to said received first and second beams of inert light.

22. Apparatus as claimed in claim 15, wherein:
said third means include means for providing and transmitting a first beam of coherent inert light on said object path, for reflection of a first part of said first beam of inert light onto itself at said object, and for reflection of a second part of said first beam of inert light onto itself at said recording medium, and for providing and transmitting a second beam of coherent inert light on said reference path, for reflection of said second beam of inert light onto itself at said recording medium; and said fourth means include means for receiving said reflected first and second parts of said first beam of inert light and said reflected second beam of inert light, and for providing said indication of said instant in response to said received first and second parts of said first beam of inert light and said received second beam of inert light.

23. Apparatus for making on a holographic recording medium a hologram of information contained in an object, comprising in combination:
first means for emitting a pulselike beam of coherent actinic light in response to a control signal;
second means operatively associated with said first means for splitting said beam of coherent actinic light into an object beam and a reference beam, and for directing said object beam along a first path leading to said recording medium by way of said object for a modulation of said object beam by said information, and for directing said reference beam along a second path leading to said recording medium for an interference of said modulated object beam with said reference beam and a recording of resulting interference patterns on said recording medium;
third means operatively associated with said second means for providing a beam of coherent inert light, for reflection of a first part of said beam of coherent inert light at said recording medium, and for reflection of a second part of said beam of coherent inert light at said object;
fourth means operatively associated with said second means for receiving said reflected first and second parts of said beam of coherent inert light and for deriving from said received first and second parts an indication of the instant at which conditions in said object and reference paths permit to an establishment and recording of said interference patterns; and
fifth means connected between said first and fourth means for providing said control signal for said first means in response to said indication derived by said fourth means.

24. Apparatus as claimed in claim 23, including:
sixth means operatively associated with said third means for directing a third part of said beam of coherent inert light to said fourth means;
said fourth means being operatively associated with said second and sixth means for receiving said third part in addition to said reflected first and second parts of coherent inert light and for deriving from said received first, second and third parts said indication of an instant at which conditions in said object and reference paths permit an establishment and recording of said interference patterns.

25. Apparatus for making on a holographic recording medium a hologram of information contained in an object, comprising in combination:
first means for emitting a pulselike beam of coherent actinic light in response to a control signal;
second means operatively associated with said first means for splitting said beam of coherent actinic light into an object beam and a reference beam, and for directing said object beam along an object path leading to said recording medium by way of said object for a modulation of said object beam by said information, and for directing said reference beam along a reference path leading to said recording medium for an interference of said modulated object beam with said reference beam and a recording of resulting interference patterns on said recording medium;
third means for providing a beam of coherent inert light;
fourth means operatively associated with said second and third means for transmitting a first part of said beam of coherent inert light on said object path;
fifth means operatively associated with said third and fourth means for deriving from said transmitted first part of said beam of coherent inert light and from a second part of said beam of coherent inert light an indication of the instant at which conditions in said object path permit to an establishment and recording of said interference patterns; and fifth means connected between said first and fourth means for providing said control signal for said first means in response to said indication derived by said fourth means.

* * * * *